US011455904B2

(12) United States Patent
Harrison

(10) Patent No.: US 11,455,904 B2
(45) Date of Patent: Sep. 27, 2022

(54) VEHICLE ROLLOVER SIMULATOR STABILIZER AND METHOD OF USE

(71) Applicant: Robert Harrison, Coleman, TX (US)

(72) Inventor: Robert Harrison, Coleman, TX (US)

( * ) Notice: Subject to any disclaimer, the term of this patent is extended or adjusted under 35 U.S.C. 154(b) by 461 days.

(21) Appl. No.: 16/599,332

(22) Filed: Oct. 11, 2019

(65) Prior Publication Data

US 2021/0110730 A1    Apr. 15, 2021

(51) Int. Cl.
| | | |
|---|---|---|
| *G09B 9/04* | (2006.01) | |
| *B62D 25/24* | (2006.01) | |
| *B62D 25/20* | (2006.01) | |
| *B60R 16/023* | (2006.01) | |

(52) U.S. Cl.
CPC ............ *G09B 9/04* (2013.01); *B60R 16/0233* (2013.01); *B62D 25/2036* (2013.01); *B62D 25/24* (2013.01)

(58) Field of Classification Search
CPC .... G09B 9/04; G09B 9/02; G09B 9/00; A63B 7/00; A63B 31/02
See application file for complete search history.

(56) References Cited

U.S. PATENT DOCUMENTS

| | | | |
|---|---|---|---|
| 4,747,778 | A | 5/1988 | Haltbrekken |
| D345,178 | S | 5/1994 | Peterson |
| 5,453,011 | A | 9/1995 | Feuer et al. |
| 6,142,877 | A | 11/2000 | Nishimura |
| 6,256,601 | B1 | 7/2001 | Wipasuramonton et al. |
| 7,373,801 | B2 | 5/2008 | Friedman et al. |
| 7,775,082 | B2 | 8/2010 | Friedman et al. |
| 7,950,268 | B2 | 5/2011 | Friedman et al. |
| 8,758,016 | B1 | 6/2014 | Henriksson |
| 9,873,058 | B2 | 1/2018 | Magrath, III |
| 10,096,262 | B1 | 10/2018 | Venditte |
| 2007/0020587 | A1 | 1/2007 | Seymore et al. |
| 2007/0111170 | A1 | 5/2007 | Lefton |
| 2010/0028837 | A1 | 2/2010 | Holloway |
| 2011/0153298 | A1 | 6/2011 | Stein et al. |

FOREIGN PATENT DOCUMENTS

| | | |
|---|---|---|
| GB | 2488025 | 8/2012 |
| KR | 200421509 | 7/2006 |
| KR | 101081690 | 11/2011 |

(Continued)

OTHER PUBLICATIONS

"Rollover Trainers/Simulators" www.kirilafire.com https://web.archive.org/web/20150315062627/https://www.kirilafire.com/tactical-security.html (Mar. 15, 2015).

(Continued)

*Primary Examiner* — Robert J Utama
(74) *Attorney, Agent, or Firm* — Schultz & Associates, P.C.

(57) ABSTRACT

A vehicle rollover simulator is provided. The rollover simulator includes a cage assembly that is rotationally suspended in a frame assembly. A transmission motor assembly is removably connected to the frame assembly and to the cage assembly to rotate the cage assembly to an inverted position for training. A brake assembly is provided that prevents rotation of the cage assembly and significantly enhances stability. The assemblies of the simulator can be disassembled and are sized to be readily carried by hand through typically dimensioned doorways, hallways and stairwells such that manually moving the rollover simulator is readily accomplished.

20 Claims, 11 Drawing Sheets

(56) References Cited

FOREIGN PATENT DOCUMENTS

| KR | 101228129  | 2/2013  |
|----|------------|---------|
| KR | 101325652  | 11/2013 |
| KR | 101695947  | 1/2017  |
| WO | 2013153229 | 10/2013 |

OTHER PUBLICATIONS

"Racesafe Speedway Rollover Safety Simulator" www.motorsport-safety.org https://www.moto rsport-safety.org/forums/driver-safety/racesafe%E2%84%A2-speedway-rollover-safety-simulator (Mar. 18, 2015).

"Advanced Safety Trainers" www.indiamart.com, https://web.archive.org/web/20190205172451/https://www.in diamart.com/vertexresearchcentre/advanced-safety-trainers.html (Feb. 5, 2019).

VEHICLE ROLLOVER SIMULATOR STABILIZER AND METHOD OF USE

FIELD OF THE INVENTION

The present disclosure relates to emergency medical training equipment. In particular, the disclosure relates to equipment designed to simulate an inverted vehicle for the purpose of training of occupants and emergency medical services personnel.

BACKGROUND OF THE INVENTION

Emergency medical treatment is often provided at the location of a rolled or inverted vehicle. Medical treatment of passengers is often required while the passengers are trapped in the inverted vehicle. The inverted position of the vehicle often blocks access to vehicle exits and constrains passengers in awkward and dangerous positions. Further, the position of the vehicle, or damage to it, limits access to the passengers. Administering medical treatment in these conditions is challenging because of the lack of accessibility to the interior of the vehicle and because of the unusual positions of the passengers.

The rigors of delivering first aid in an inverted vehicle requires extensive training of medical professionals to avoid endangering passengers or themselves. For example, medical professionals must be trained to enter the vehicle from narrow openings above or below a vehicle in an inverted position. Further, training must include extraction of passengers from various positions and vehicle exits. As a result, training requires access to all possible positions of an inverted vehicle. Training also requires that the simulator support both passengers and medical personal in a stable configuration during training.

To this end, various prior art training devices have been developed to simulate inverted vehicles. Yet, none of them is entirely satisfactory.

For example, U.S. Pat. No. 7,775,082 to Friedman, et al. discloses an automotive vehicle test fixture. The test fixture is intended to simulate controlled, destructive rollover impact tests for full scale vehicles. The test fixture includes a cradle for holding and rotating a test vehicle and a sled for simulating impacts with a road surface. The simulator is a permanent fixture and is not designed to be mobile.

U.S. Pat. No. 7,373,801 to Friedman, et al. discloses a vehicle rollover test fixture. This fixture is very large and enables rotation of an entire vehicle. It also is not easily movable.

U.S. Publication No. 2011/0153298 to Stein, et al. discloses a vehicle rollover simulation. The simulation requires a very large apparatus which models a vehicle undergoing both translational and rotational movement.

U.S. Pat. No. D345,178 to Peterson discloses a large simulator and includes a rotatable occupant cab mounted on a tandem axel trailer. It cannot be easily disassembled or used in a normal classroom environment.

Korean Publication No. KR101325652B1 to Yeong, et al. discloses a vehicle safety education roll over simulator with a rotatable portion. This simulator is very large and enables rotation of an entire vehicle so that seat belts can be demonstrated.

Korean Publication No. KR101081690B1 to Hee, et al. discloses an apparatus for experiencing overturn of an automobile. This apparatus is very large and enables rotation of an entire vehicle.

One major drawback of prior art rollover vehicle simulators is that they are generally large and heavy. This makes them at best time consuming to install and move.

Another major drawback of prior art rollover vehicle simulators is that they are often not completely stable. For instance, large simulators can allow unexpected shifts position due to an unstable drive train or suspension or due to the connection between the vehicle and the simulator. Even slight unintended movement can be dangerous to both trainees and occupants. Unintended movement of the simulator is also a clear distraction during training. Hence, reducing or eliminating unintended simulator movement is important to both safety and efficacy of training.

As a result, what is needed in the art is a vehicle rollover simulator that is easily transported and assembled, but that is also capable of full 360° range of motion while being highly stable and resistant to unintentional movement during use.

SUMMARY OF THE INVENTION

Embodiments of the invention include a vehicle rollover simulator apparatus for purposes of training emergency medical services personnel and vehicle occupants. In a preferred embodiment, the vehicle rollover simulator comprises a frame assembly, a cage assembly, a brake assembly, a transmission bracket assembly, a transmission motor assembly, a rotary position encoder and a rotary electrical coupling. A controller is provided to motivate and monitor the position of the cage assembly.

The cage assembly is designed and equipped to simulate a typical passenger vehicle.

The frame assembly is adapted to rotatably suspend the cage assembly on its longitudinal horizontal axis.

The brake assembly is adapted to fix the position of the frame on its axis and significantly improves stability of the cage assembly, especially when in an inverted position or in active use.

The transmission bracket assembly supports and stabilizes the transmission motor assembly.

The transmission motor assembly provides torque sufficient to rotate the cage assembly on its axis.

The rotary position encoder and rotary electrical coupling are adapted to communicate the position of the cage assembly to the controller and to provide power and electrical signaling to the cage assembly.

Each of the assemblies can be assembled and disassembled with hand tools which significantly improves portability of the vehicle rollover simulator apparatus. Further, the larger assemblies are comprised of subassemblies that can be carried by hand through typically dimensioned doorways, hallways and stairwells, thus further improving portability. The entire simulator is also mounted on a base frame that can be easily accessed and moved with commonly available pallet jacks or fork lifts.

In a preferred embodiment, a controller is provided which coordinates and monitors the cage assembly during use. Software is provided which causes the controller to activate the motor assembly, activate and deactivate warning lights and horns, and to receive and communicate operator commands and positional changes of the simulator during use.

BRIEF DESCRIPTION OF THE DRAWINGS

The disclosed embodiments will be described with reference to the accompanying drawings.

DETAILED DESCRIPTION OF THE INVENTION

Figure 1:
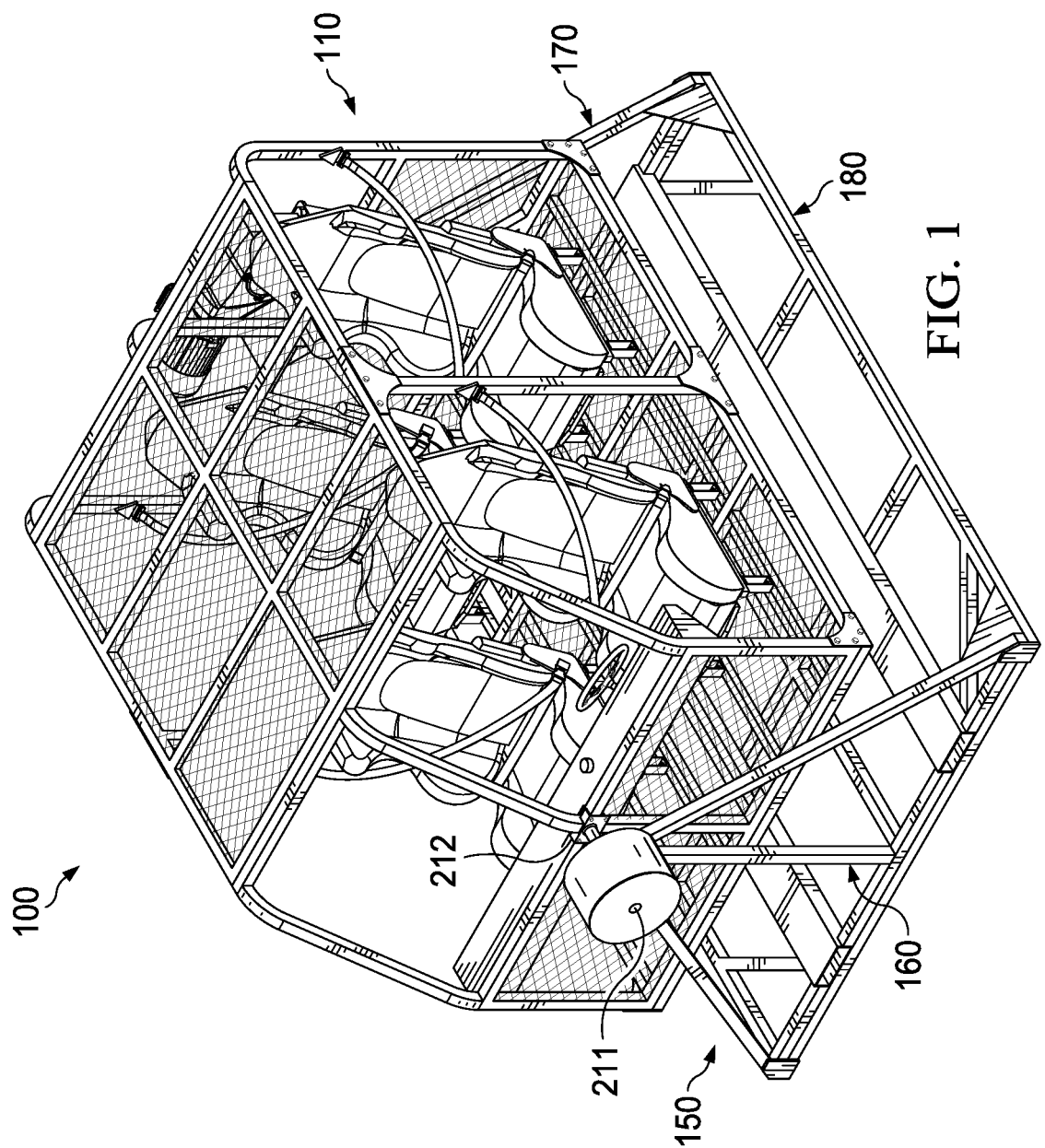
FIG. 1 is an isometric view of a preferred embodiment of the vehicle rollover simulator.

Referring to FIG. 1, vehicle rollover simulator apparatus 100 generally includes cage assembly 110 and frame assembly 150. By rotating cage assembly 110 relative to frame assembly 150, cage assembly 110 efficiently simulates a passenger compartment of a rolled vehicle in a relatively compact volume with a relatively small area footprint.

Frame assembly 150 includes base subassembly 180, front stanchion subassembly 160 removably coupled to base subassembly 180, and rear stanchion subassembly 170 removably coupled to base subassembly 180.

Cage assembly 110 is sized to approximate the typical size of a passenger compartment of a sub-compact car. Such a design provides a medical training environment with at least four occupants in a relatively small volume of space and with a relatively small area footprint. For example, in one preferred embodiment, the cage assembly may be dimensioned sized at an approximate length of 7', width of 6' and height of 5'. Frame assembly 150 is sized to be wider and longer than the cage assembly to ensure stability when the cage assembly is inverted.

To further improve stability, cage assembly 110 and frame assembly 150 are fabricated from two-inch square channel of high-tensile steel. In another embodiment, the cage assembly and frame assembly may be constructed from two-inch square steel tubing.

It is a significant advantage of the preferred embodiment that it may be readily disassembled with hand tools. A further advantage is that each assembly can also be disassembled into smaller subassemblies with hand tools. The ease of assembly and disassembly facilitates moving the entire simulator from one location to another location.

The assemblies and subassemblies are assembled with fasteners such as bolts to allow easy assembly and disassembly. In another embodiment, where additional stability is required, the assemblies and subassemblies can be joined together by welding.

It is also a significant advantage of the preferred embodiment that the base frame may be easily accessed and lifted by pallet jacks or fork lifts of reasonably small size to facilitate easy movement.

Figure 2:
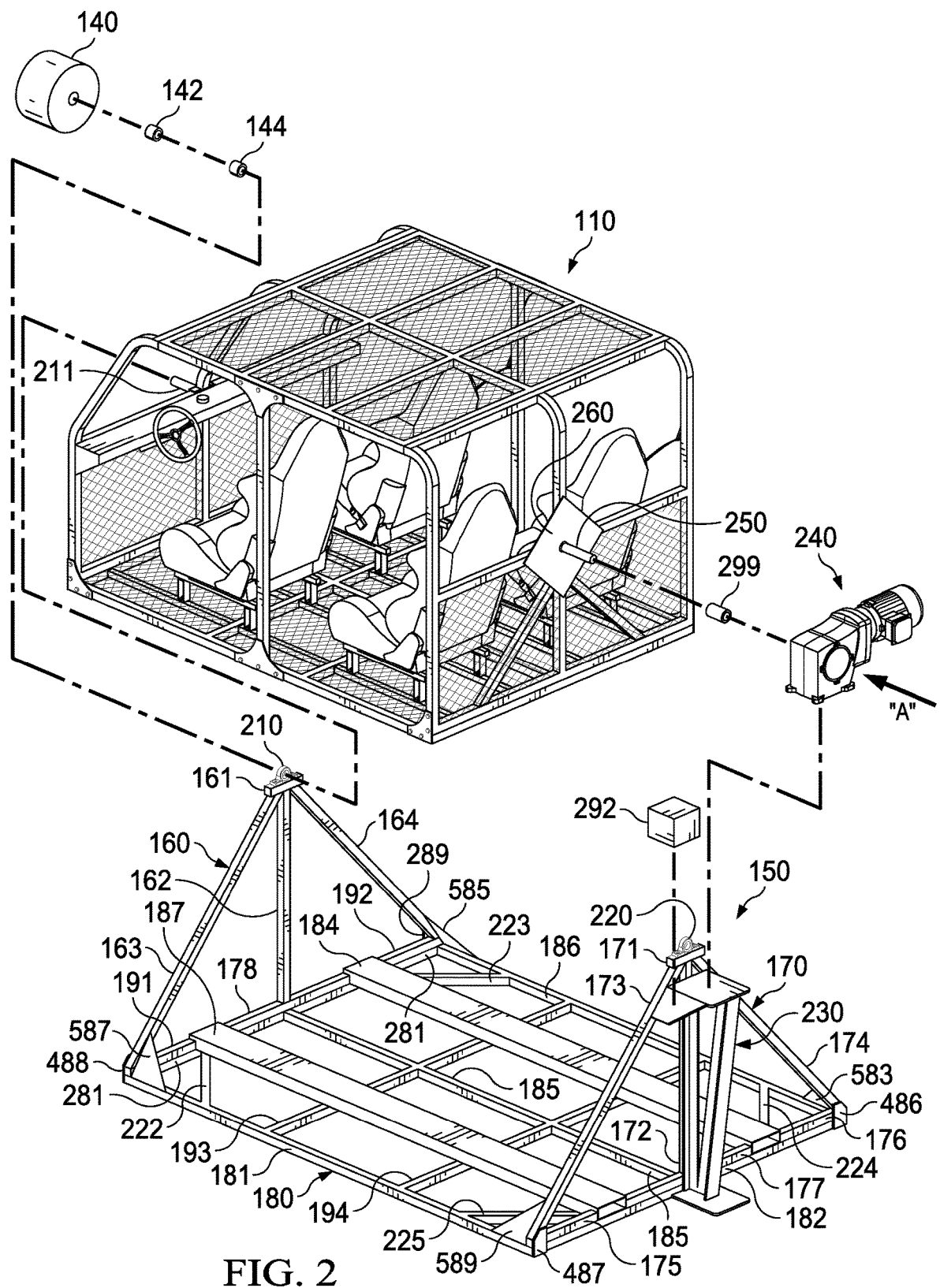
FIG. 2 is an exploded isometric view of a preferred embodiment of the vehicle rollover simulator.

Referring then to FIGS. 1 and 2, cage assembly 110 is rotatably coupled to frame assembly 150 by front rotary shaft 211 and rear rotary shaft 250. The front rotary shaft is welded to midpoint connector 212. The midpoint connector distributes the load imposed by the front rotary shaft to the frame of the cage, as will be further described. The rear rotary shaft is welded to reinforcement plate 260. The reinforcement plate distributes the torque provided by the rear rotary shaft uniformly to the cage assembly to reduce stress and vibration. The front rotary shaft is fitted in front bearing block 210. The rear rotary shaft is fitted in rear bearing block 220. The front bearing block is welded or bolted to attachment points on front stanchion subassembly 160. The rear bearing block is welded or bolted to attachment points on rear stanchion subassembly 170.

Transmission mounting bracket assembly 230 is attached to rear stanchion subassembly 170, as will be further described.

Frame assembly 150 includes base subassembly 180, rear stanchion subassembly 170 and front stanchion subassembly 160.

Base subassembly 180 includes left longitudinal member 181 and right longitudinal member 186.

Left longitudinal member 181 is connected to front transverse member 281 and rear transverse member 182. Left longitudinal member 181 is further connected to left front brace 222 and left rear brace 225. Left longitudinal member 181 is further connected to forward transverse member 193 and rear transverse member 194.

Right longitudinal member 186 is connected to front transverse member 281 and rear transverse member 182. Right longitudinal member 186 is further connected to right front brace 223 and right rear brace 224. Right longitudinal member 186 is further connected to forward transverse member 193 and rear transverse member 194.

Front transverse member 281 is further connected to right front foot 192 and left front foot 191. Front transverse member 281 is further connected to central front support foot 178. Front transverse member 281 is further connected to center longitudinal member 185.

Rear transverse member 182 is further connected to left rear foot 175, right rear foot 176 and central rear support foot 177. Rear transverse member 182 is further connected center longitudinal member 185.

Both forward transverse member 193 and rear transverse member 194 are centrally connected to center longitudinal member 185 in flush connections.

Base subassembly 180 includes two fork lift channels, right fork lift channel 184 and left fork lift channel 187. The fork lift channels are important because they allow for movement of the entire simulator after it is assembled. Further, the longitudinal placement of the fork lift channels is important because it allows the simulator to be moved without causing rotation of the cage assembly.

Right fork lift channel 184 is connected to right front foot 192 and central front support foot 178. Right fork lift channel 184 is further connected to right rear foot 176 and central rear support foot 177. Right fork lift channel 184 is further connected to forward transverse member 193 and rear transverse member 194. Right fork lift channel 184 is further connected to front transverse member 281, rear transverse member 182, right rear brace 224 and right front brace 223.

Left fork lift channel 187 is connected to left front foot 191 and central front support foot 178. Left fork lift channel 187 is further connected to left rear foot 175 and central rear support foot 177. Left fork lift channel 187 is further connected to front transverse member 281 and rear transverse member 182. Left fork lift channel 187 is further connected to forward transverse member 193, rear transverse member 194, left rear brace 225 and left front brace 222.

Front stanchion subassembly 160 is comprised of left front diagonal brace 163, right front diagonal brace 164 and central front brace 162. Left front diagonal brace 163 is further connected to front lateral beam section 161 and left front foot 191. Central front brace 162 is also connected to front lateral beam section 161 and central front support foot 178. Right front diagonal brace 164 is connected to central front brace 162 and right front foot 192. Front bearing block 210 is removably mounted to front lateral beam section 161.

Rear stanchion subassembly 170 is comprised of left rear diagonal brace 173, central rear brace 172 and right rear diagonal brace 174. Left rear diagonal brace 173 is connected to left rear foot 175 and rear lateral beam section 171. Central rear brace 172 is connected to central rear support foot 177 and rear lateral beam section 171. Right rear diagonal brace 174 is connected to right rear foot 176 and rear lateral beam section 171. Rear lateral beam section 171 removably supports rear bearing block 220.

Left front diagonal brace 587 connects left front diagonal brace 163, left front foot 191, and left longitudinal member 181. Right front diagonal brace 585 connects right front diagonal brace 164, right front foot 192 and right longitudinal member 186. Left rear diagonal brace 589 connects left rear diagonal brace 173, left rear foot 175, and left longitudinal member 181. Right rear diagonal brace 583 connects right longitudinal member 186, right rear diagonal brace 174 and right rear foot 176.

Each of the diagonal braces is positioned at an approximate 45° angle relative to the base subassembly to enhance stability.

Left front alignment plate 488 connects left front diagonal brace 163, left front foot 191, front transverse member 281 and left longitudinal member 181.

Right front alignment plate 289 connects right front diagonal brace 164, right front foot 192, front transverse member 281 and right longitudinal member 186.

Left rear alignment plate 487 connects left rear diagonal brace 173, left rear foot 175, rear transverse member 182, and left longitudinal member 181.

Right rear alignment plate 486 connects right rear diagonal brace 174, right rear foot 176, rear transverse member 182 and right longitudinal member 186.

Controller box 292 is mounted to transmission mounting bracket assembly 230, as will be further described. In a preferred embodiment, the controller box also physically supports a keypad and LCD display (not shown) that are connected to the controller. The controller box also serves as a mounting location for warning lights, discrete control switches, and audible signal generators, as will be further described. In a preferred embodiment, the controller box is a Nema 6"×8"×4" enclosure Model No. WA 060804GSC available from Automation Direct.

Transmission motor assembly 240 is removably attached to transmission mounting bracket assembly 230, as will be further described. The output shaft of the transmission motor assembly is removably attached to the rear rotary shaft 250 with shaft coupling 299. Shaft coupling 299, in a preferred embodiment includes a linear key and keyway for use in fixing the coupling to the output shaft of the transmission and the rear rotary shaft. Transmission motor assembly 240 provides rotary mechanical power with sufficient torque to rotate cage assembly 110 (including seat assemblies with trainee occupants) relative to frame assembly 150.

Brake assembly 140 is removably coupled to front stanchion subassembly 160 and front rotary shaft 211. In an alternate embodiment, brake assembly 140 can be removably coupled to rear stanchion subassembly 170 and to rear rotary shaft 250. Brake assembly 140, when engaged prevents undesired rotation of cage assembly 110 relative to frame assembly 150.

In a preferred embodiment, brake assembly 140 includes an electrically engaged shaft break having an automatic spring release. The preferred brake assembly is SEPAC Model METB 1065. In an alternative embodiment, the brake assembly can include a manually operated mechanical brake such as a disk brake or drum brake.

Brake assembly 140 is positioned adjacent rotary position encoder 142. Rotary position encoder 142 can be an optical absolute rotary position encoder, such as the RESOLUTE™ Absolute Encoder System with RESA30 Rotary (Angle) Ring available from Renishaw of Gloucestershire, United Kingdom. The optical encoder can include an optical marker and an optical sensor. The optical marker can be a ring or disk with a radial series of marks to demarcate angular position of the cage assembly relative to the frame assembly. In a preferred embodiment, the optical marker is preferably located on the front rotary shaft and rotates exactly with the cage assembly. The optical sensor is adjacent the brake assembly and is held stationary relative to the frame assembly.

The rotary position encoder is positioned adjacent rotary electrical coupling 144. Rotary electrical coupling 144 provides power to the cage assembly for operation of lights and signal connections between the switches located in the cage assembly and the controller. A suitable commercially available rotary electrical coupling is Rotary Systems SR005 Series Part No. 31051-0506-000.

Figure 3:
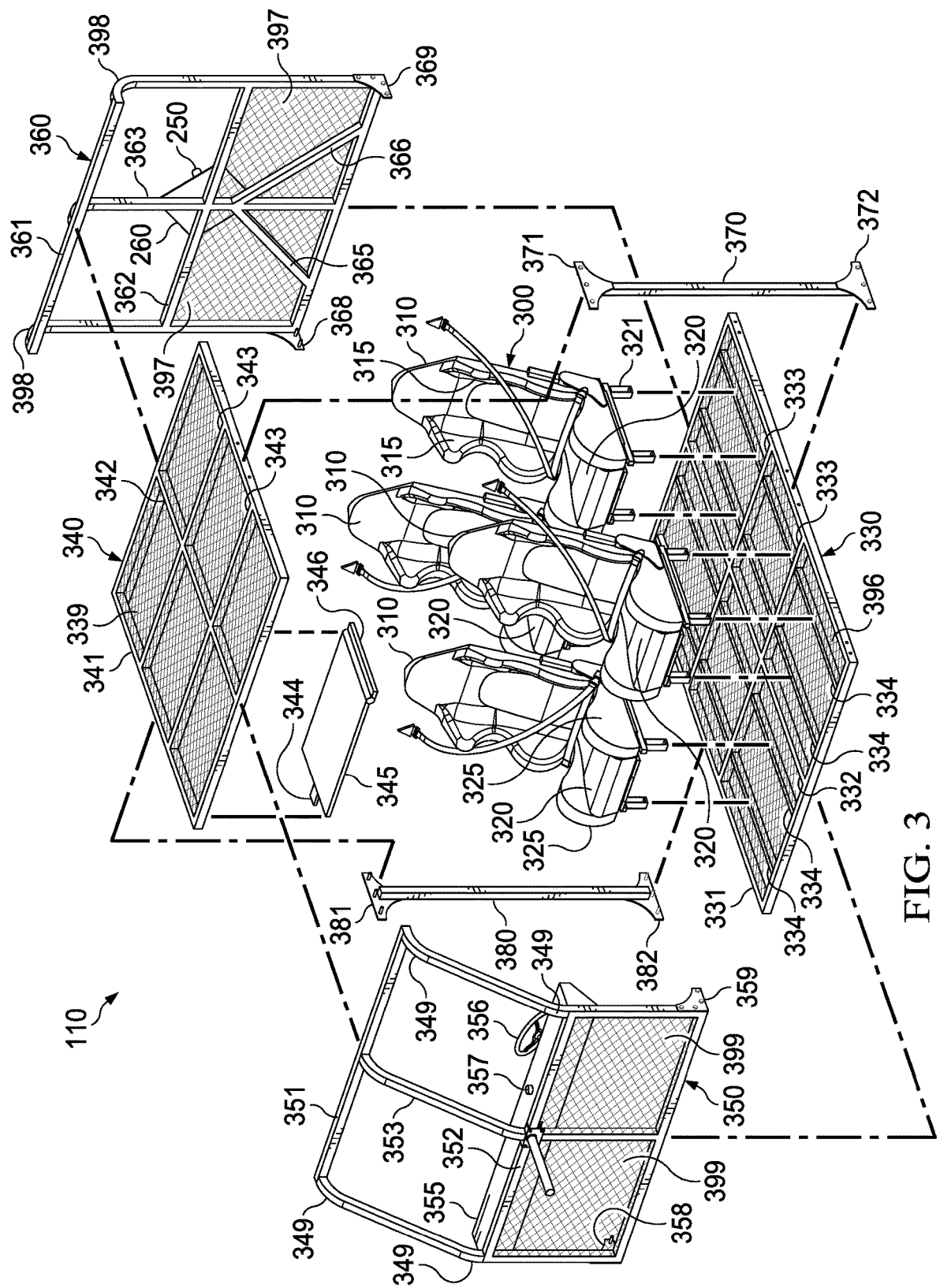
FIG. 3 is an expanded isometric view of a cage assembly of a preferred embodiment of the vehicle rollover simulator.

Referring to FIG. 3, cage assembly 110 includes floor panel subassembly 330, roof panel subassembly 340, front panel subassembly 350 and rear panel subassembly 360.

Floor panel subassembly 330 includes floor perimeter frame 331 and four longitudinal support tracks 334 for seat mounting. The support tracks are each provided with rows of equally spaced holes (not shown) so that the positions of the seats may be adjusted in a linear pattern front to back. Floor panel subassembly 330 includes a longitudinal brace 332 and two cross braces 333 for rigidity. The longitudinal brace and the cross braces are centrally connected with a flush connection. Floor panel subassembly 330 includes expanded steel grating 396 to provide a rigid floor surface while permitting visibility from outside and inside the cage.

Roof panel subassembly 340 includes roof perimeter frame 341. Roof panel subassembly 340 includes longitudinal brace 342 and two cross braces 343 for rigidity. The longitudinal brace and the cross braces are centrally connected with a flush connection. Roof panel subassembly 340 includes expanded steel grating 339 to provide a rigid ceiling surface while permitting visibility. Roof panel subassembly 340 includes hinged subpanel section 345 that can be opened or closed to simulate structural damage to a rolled vehicle and partially obstruct access to an interior of the cage assembly. The subpanel section is connected to the frame by a rear piano hinge 346 and a side latch mechanism 344.

In an alternative embodiment, at least one floor panel, roof panel, first panel, and second panel could include at least one subpanel section that can be opened to simulate structural damage to a rolled vehicle and partially obstruct access to an interior of the cage assembly. Of course, the invention is not limited to the presence of such a subpanel and this optional feature can be omitted.

Front panel subassembly 350 includes front perimeter frame 351. In a preferred embodiment, the front perimeter frame is angled to simulate the incline of a compact car windshield. The angled perimeter frame is important because it aids in more realistically modeling a vehicle which often includes angled posts adjacent the windshield. Front perimeter frame 351 includes curved corners 349. Lateral brace 352 and vertical brace 353 are connected to the front perimeter frame 351 and are centrally joined in a flush connection. In a preferred embodiment, the vertical brace is angled to match the angled perimeter frame. Midpoint connector 212 is welded or bolted to lateral brace 352 and vertical brace 353 at the flush connection. Front rotary shaft 211 is welded to the midpoint connector. The front rotary shaft provides an axial pivotal support for the cage, when assembled. The midpoint connector serves to distribute the load transmitted from the front rotary shaft to lateral brace 352 and vertical brace 353.

Front panel subassembly 350 includes connection plates 358 and 359 which provide additional rigidity to the frame when assembled. Front panel subassembly 350 includes mock dashboard 355. The mock dashboard is welded or bolted to lateral brace 352. Mock steering wheel 356 is coupled to mock dashboard 355. The mock steering wheel pivots on its axis. Emergency switch 357 is provided in the mock dashboard. Emergency switch 357 is operatively connected to the processor through the rotary electrical connector and operates to stop movement of the cage assembly during training in emergencies, as will be further described. Mock dashboard 355 can be padded and can include mock controls, mock lights and mock instruments to facilitate training at night. Front panel subassembly 350 includes expanded steel grating 399 on a bottom portion to provide a rigid and immobile surface while permitting visibility.

Rear panel subassembly 360 includes a rear perimeter frame 361. The rear perimeter frame includes curved corners 398. Lateral brace 362 and vertical brace 363 are connected to rear perimeter frame 361 and are centrally joined in a flush connection. Diagonal braces 365 and 366 are connected to rear perimeter frame 361 and vertical brace 363 and are provided to increase rigidity of the cage. In a preferred embodiment, the diagonal braces form a 45° angle with both the rear perimeter frame and the vertical brace. Reinforcement plate 260 is bolted or welded to lateral brace 362, vertical brace 363 and to both diagonal brace 365 and diagonal brace 366. Rear rotary shaft 250 is welded to reinforcement plate 260 and serves as an axial pivotal support for the cage. The reinforcement plate adds rigidity to the cage and serves to evenly distribute torque provided by the rear rotary shaft to the frame.

Rear panel subassembly 360 includes connection plates 368 and 369. The connection plates provide additional rigidity and strength to the frame. Rear perimeter frame 361 provides attachment points for shoulder belts associated with the rear seats. Rear panel subassembly 360 includes expanded steel grating 397 on a bottom portion to provide a rigid surface while permitting visibility.

Cage assembly 110 includes left post 370 removably coupled between the floor panel subassembly and the roof panel subassembly. Left upper connection plate 371 and left lower connection plate 372 are connected to left post 370. Left upper connection plate 371 is connected to roof perimeter frame 341 when the cage is assembled. Left lower connection plate 372 is connected to floor perimeter frame 331 when the cage is assembled.

The cage assembly also includes right post 380 removably coupled between the floor panel subassembly and the roof panel subassembly. Right upper connection plate 381 and right lower connection plate 382 are connected to right post 380. Right upper connection plate 381 is connected to roof perimeter frame 341 when the cage is assembled. Likewise, right lower connection plate 382 is connected to floor perimeter frame 331, when the cage is assembled.

The upper and lower connection plates provide additional rigidity between the perimeter frames and the posts. The posts provide attachment points for shoulder belts associated with the front seats.

A preferred embodiment of the invention has four seat subassemblies 300 located within the interior of the cage assembly. Other embodiments may have a greater or lesser number of seats. In other embodiments, child protective seats and wheel chair tie downs may be provided. Each of seat subassemblies 300 is bolted in position onto floor panel subassembly 330. Each of seat subassemblies 300 includes seat back 310 coupled to seat base 320. Each seat base 320 includes four (4) legs 321, that are bolted to longitudinal support tracks 334 of floor panel subassembly 330. Each seat back 310 includes two back lateral supports 315 to secure occupant(s) while the cage assembly is rotated. Also, each seat base 320 includes two base lateral supports 325 to secure occupant(s) while the cage assembly is rotated.

The subassemblies of cage assembly 110 can be easily disassembled and reassembled, with ordinary hand tool in order to facilitate moving the simulator to different locations, such as for example, from one classroom to another.

Figure 4:
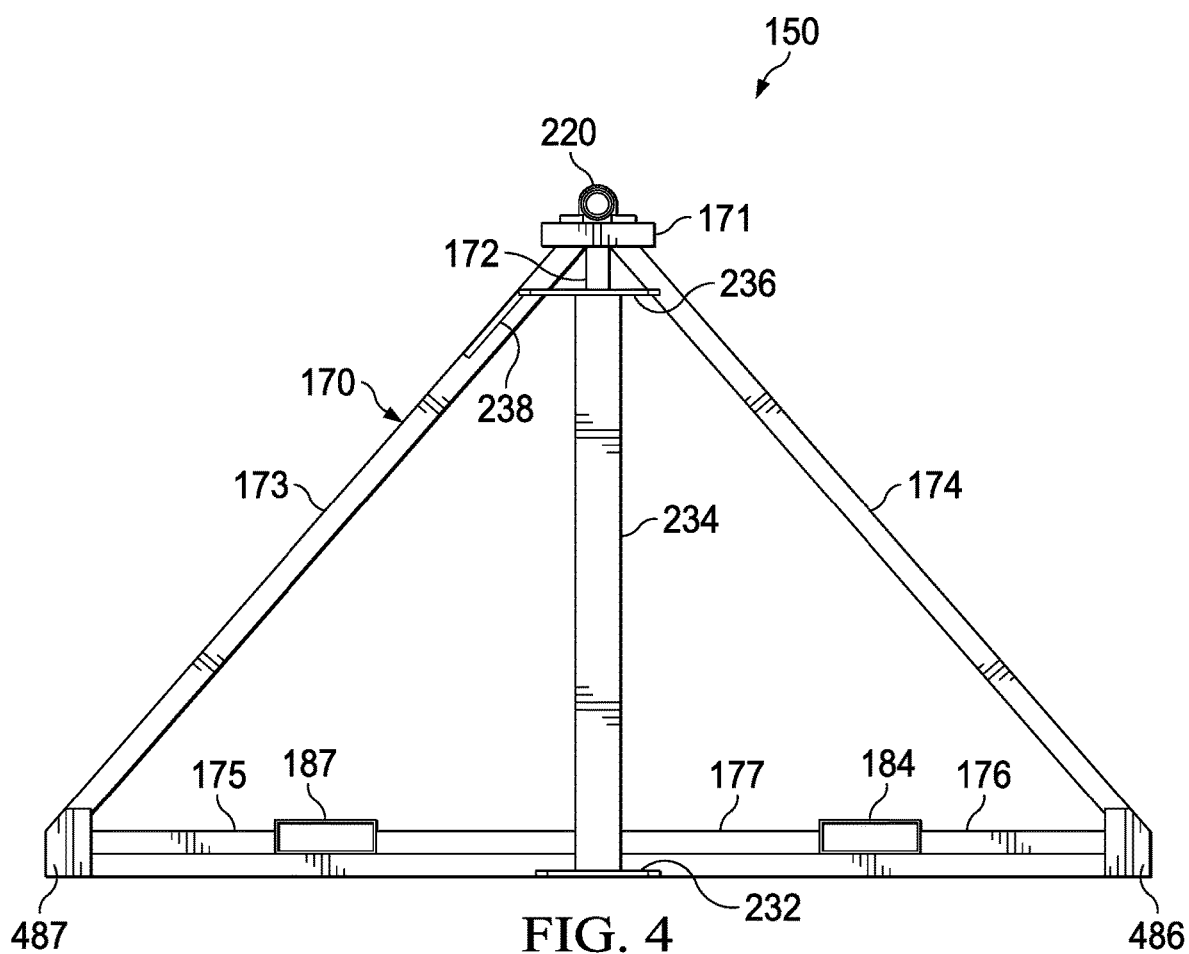
FIG. 4 is a front elevation view of a frame assembly of a preferred embodiment of the vehicle rollover simulator.
Figure 5:
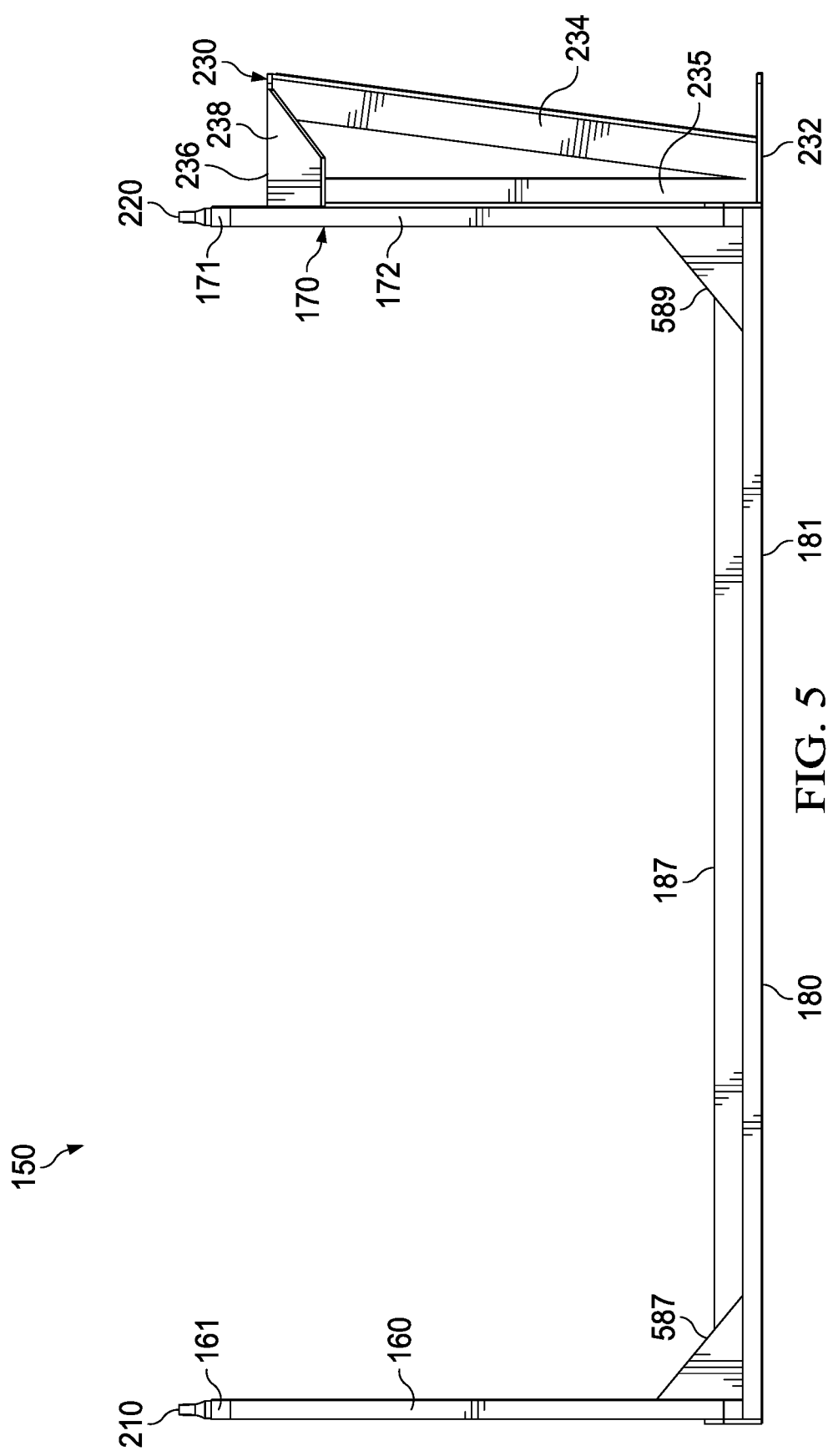
FIG. 5 is a right side elevation view of the frame assembly of a preferred embodiment of the vehicle rollover simulator.

Referring to FIGS. 4 and 5, transmission mounting bracket assembly 230 will be described.

Transmission mounting bracket assembly 230 comprises vertical support 235, diagonal support 234, base plate 232, mounting plate 236 and angle brace 238. Base plate 232 is welded to and supported by diagonal support 234 and vertical support 235. Vertical support 235 is comprised of a "T" cross section beam. Likewise, diagonal support 234 is comprised of a "T" section beam. In a preferred embodiment, diagonal support 234 is offset from vertical support 235 by an angle of approximately 5°-7°. The offset is important because it allows the transmission mounting bracket assembly to stabilize the transmission while reducing overall weight of the base frame. Vertical support 235 is welded to rear stanchion subassembly 170 along central rear brace 172. Vertical support 235 and diagonal support 234 are also connected to mounting plate 236. Mounting plate 236 is further welded to central rear brace 172, left rear diagonal brace 173 and right rear diagonal brace 174. Mounting plate 236 is further welded to angle brace 238. Angle brace 238 is, in turn, welded to left rear diagonal brace 173. The angle brace is important because it offsets the weight of the transmission and motor and adds stability to the simulator when it is active.

In this embodiment diagonal support 234 and vertical support 235 are constructed of ¼" 1030 plate steel. In this embodiment, angle brace 238 has a quadrilateral shape and is constructed of ¼" 1030 plate steel.

Figure 6:
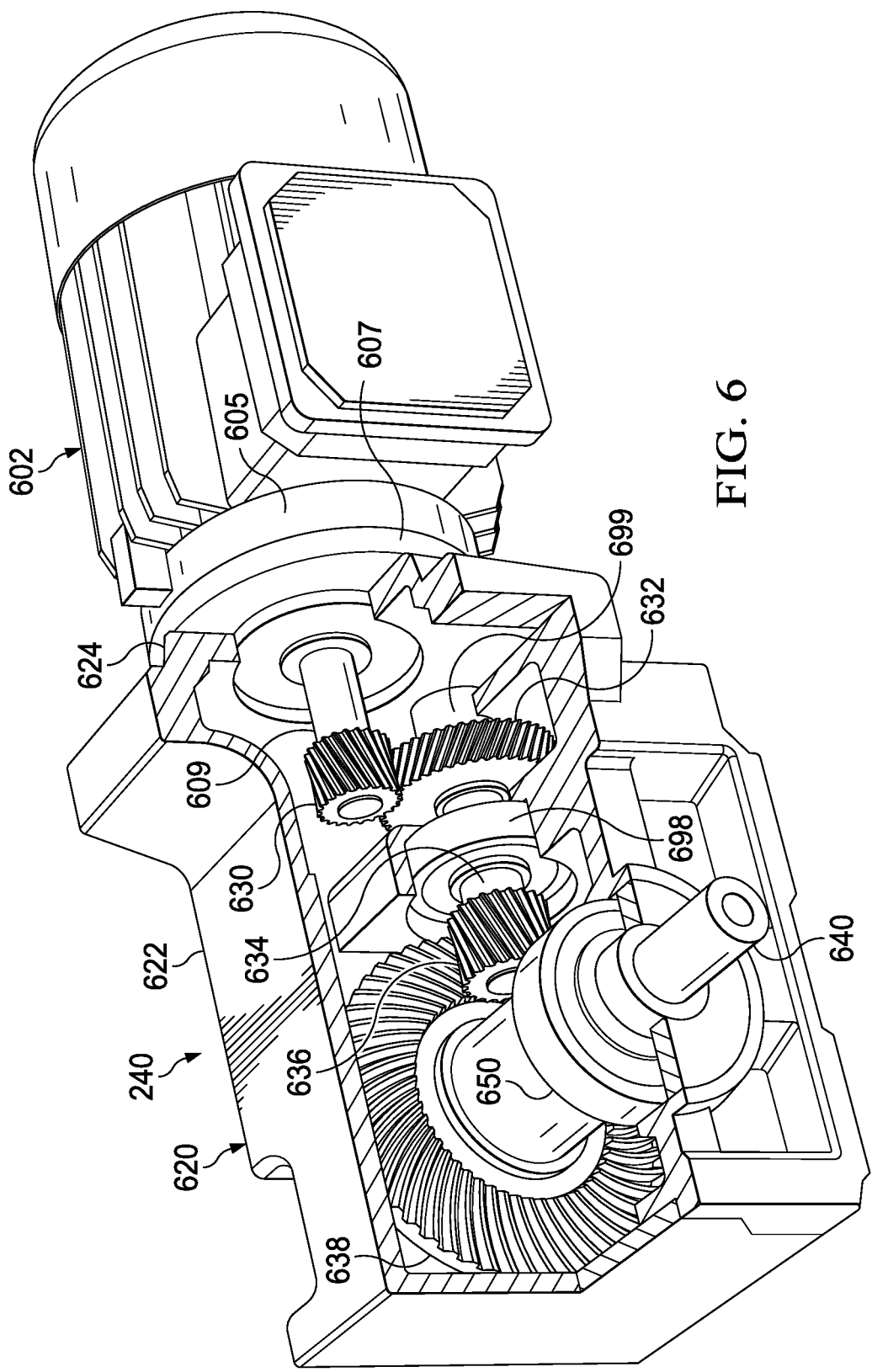
FIG. 6 is a partial section isometric view of motor transmission assembly of a preferred embodiment of the vehicle rollover simulator.

Referring to FIG. 6, transmission motor assembly 240 includes electric motor 602 and transmission 620. The transmission includes transmission enclosure 622 and enclosure flange 624. The electric motor includes motor casing 605 having casing flange 607. Casing flange 607 is bolted to enclosure flange 624. The motor can include an electrically activated running brake (not shown) located inside the motor casing. The running brake can slow and stop the motor in cooperative arrangement with a motor controller, as will be further described. Motor shaft 609 is coupled to input gear 630 of the transmission. The input gear is operationally coupled to traveler gear 632. The traveler gear is connected to internal shaft 634. The internal shaft is supported by bearing 698 and bearing 699. Transfer gear 636 is also coupled to the internal shaft. Final gear 638 is meshed to transfer gear 636. The final gear is coupled to output drive shaft 640 that is supported by primary bearing 650.

The transmission can include a worm gear drive. Such a worm gear drive can include a cylindrical worm drive gear as the transfer gear and a worm wheel (ring) gear as the final gear. The worm wheel gear can include spur or helical threads. Alternatively, the worm gear drive can include a cylindrical or tapered worm drive gear and a worm face (crown) gear.

Worm gear drives provide embodiments of the invention with several significant advantages. Worm drives are self-locking thereby eliminating movement of the output drive shaft through enhancing stability of the cage assembly relative to the frame assembly. Worm drives are also compact thereby enhancing portability and reducing weight. A suitable commercially available worm gear drive with motor is Nord Drivesystems model type SK33100-71LP/4 CUS TW.

Alternatively, the transmission motor assembly can include a bevel gear drive. A bevel gear drive optionally includes a pinion gear as the transfer gear and a face gear as the final gear, with spur teeth or spiral teeth. A suitable commercially available bevel gear drive with motor is Nord Drivesystems model type SK 9043.1 AX-90 LB/4 ECR BRE20 HL.

Figure 7:
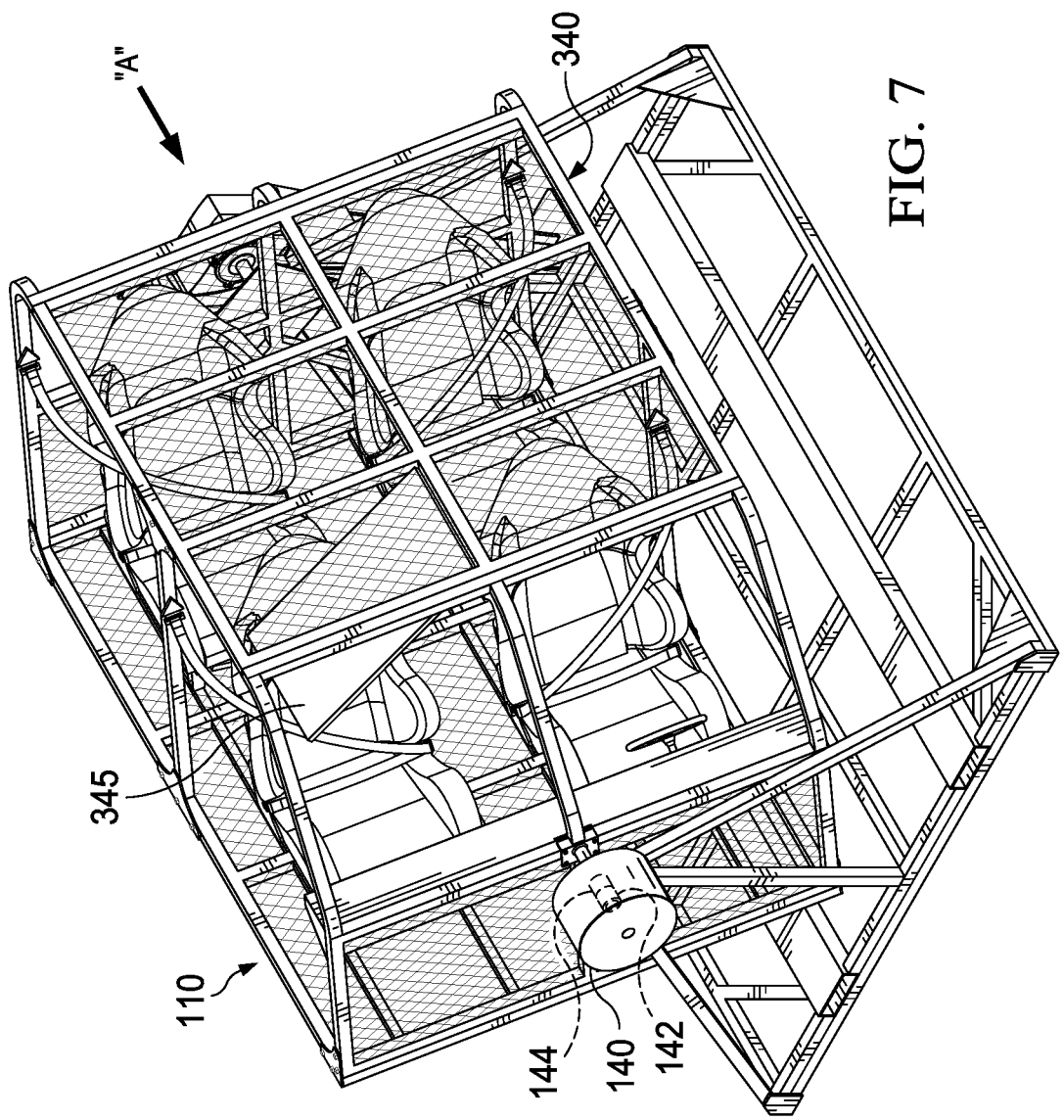
FIG. 7 is an isometric view of a preferred embodiment of the vehicle rollover simulator with the cage assembly rotated approximately 45° relative to the base frame assembly.

Referring to FIG. 7, cage assembly 110 is shown in an exemplary position rotated approximately 45° counterclockwise, relative to base of frame assembly 150, from the perspective of viewpoint "A". In this position, the gap between the bottom edge of cage assembly 110 and the top of the base of frame assembly 150 is at a minimum.

Hinged subpanel section 345 is shown in a deployed position partially obstructing assess to the front passenger portion of the interior of the cage assembly. As can be seen from the figure, hinged subpanel section 345 makes it more difficult for a trainee to reach the upper portion of an occupant of the front passenger seat.

Figure 8:
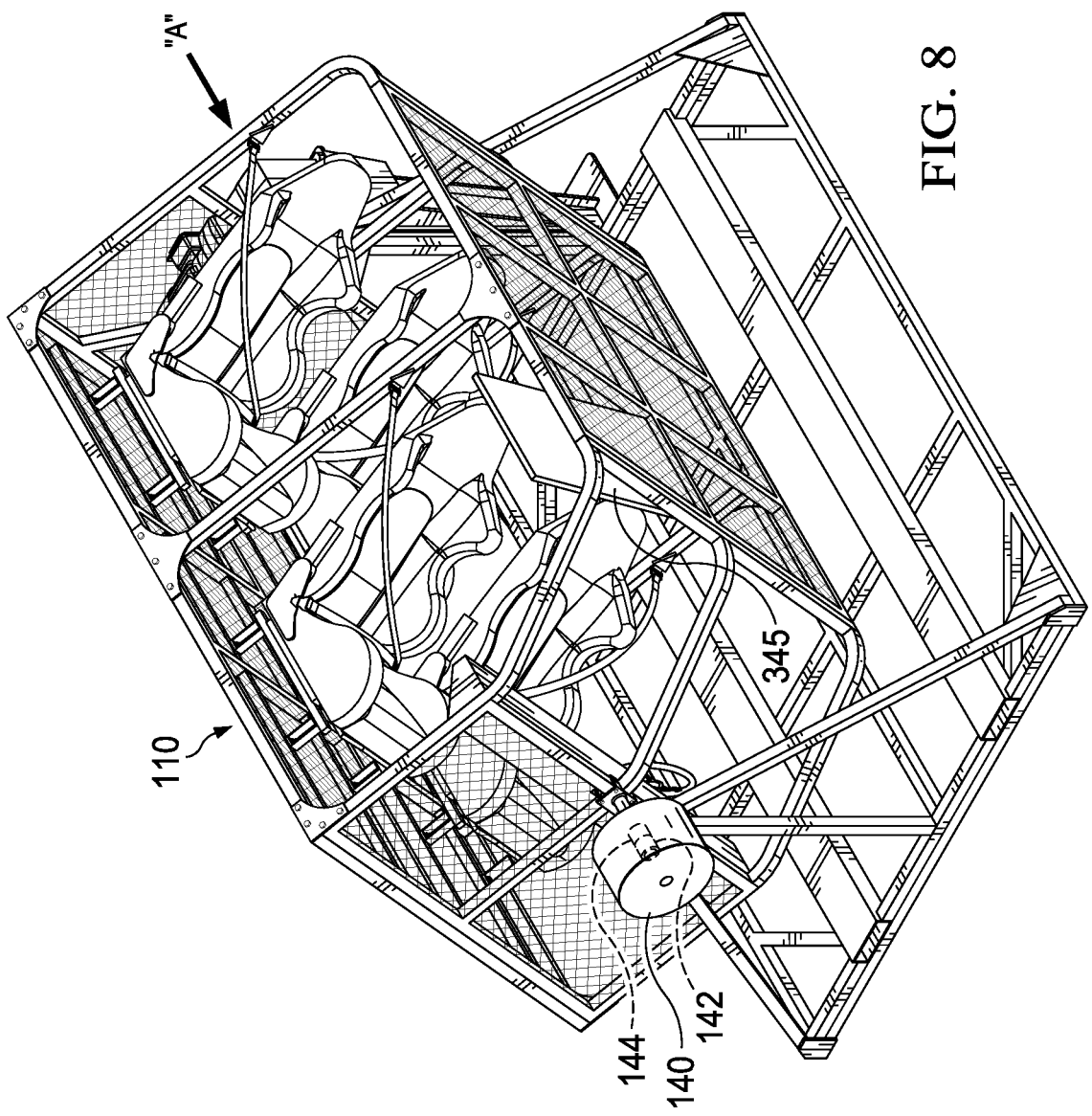
FIG. 8 is an isometric view of a preferred embodiment of the vehicle rollover simulator with the cage assembly rotated approximately 135° relative to the base frame assembly.

Referring to FIG. 8, cage assembly 110 is shown in an exemplary position rotated approximately 135° counterclockwise, relative to base of frame assembly 150, from the perspective of viewpoint "A". In this position, cage assembly 110 is partially inverted.

Figure 9:
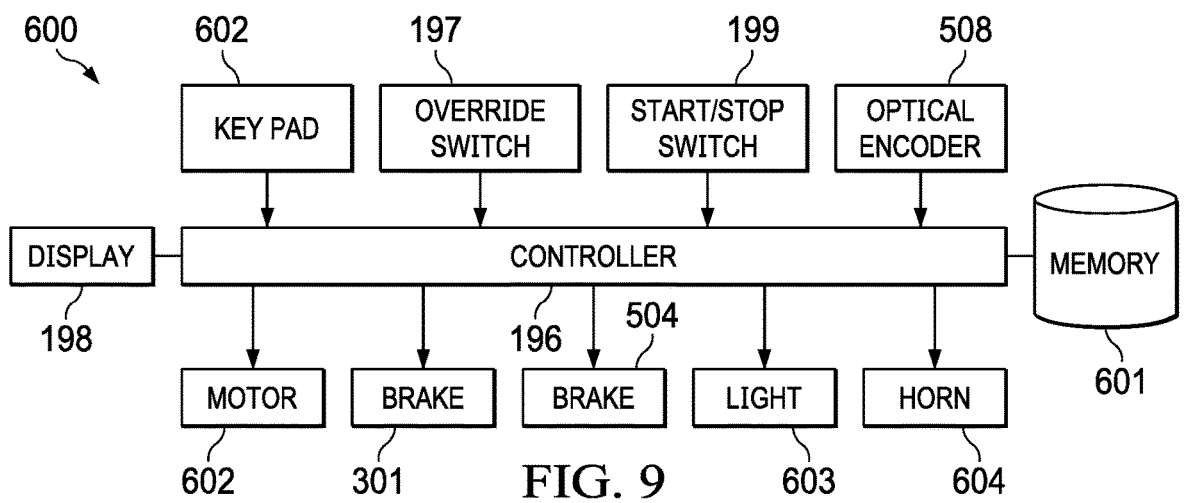
FIG. 9 is an architecture diagram of a control system of a preferred embodiment of the vehicle rollover simulator.

Referring to FIG. 9, control system 600 will be described. Control system 600 includes controller 196 operatively connected to display and input device 198. The controller is housed in a water tight enclosure such as controller box 292. In one embodiment, display and input device 198 includes a liquid crystal display screen, coupled to input keypad 606 to receive commands from a user. One acceptable input display, keypad combination is the Pi Foundation Display 7" Touchscreen available from Adafruit Industries.

The controller is also operatively connected to start/stop switch 199 and override switch 197, whose functions will be more fully described. The controller is also operatively connected to memory 601. The memory serves to store boot up instructions and program instructions for the controller, as will be further described. The controller is operatively coupled to electric motor 602, brake 301 and brake 504. The controller is also operatively coupled to optical encoder 508. The controller is also operatively connected to output warning devices such as LED light 603 and horn 604.

Figure 10:
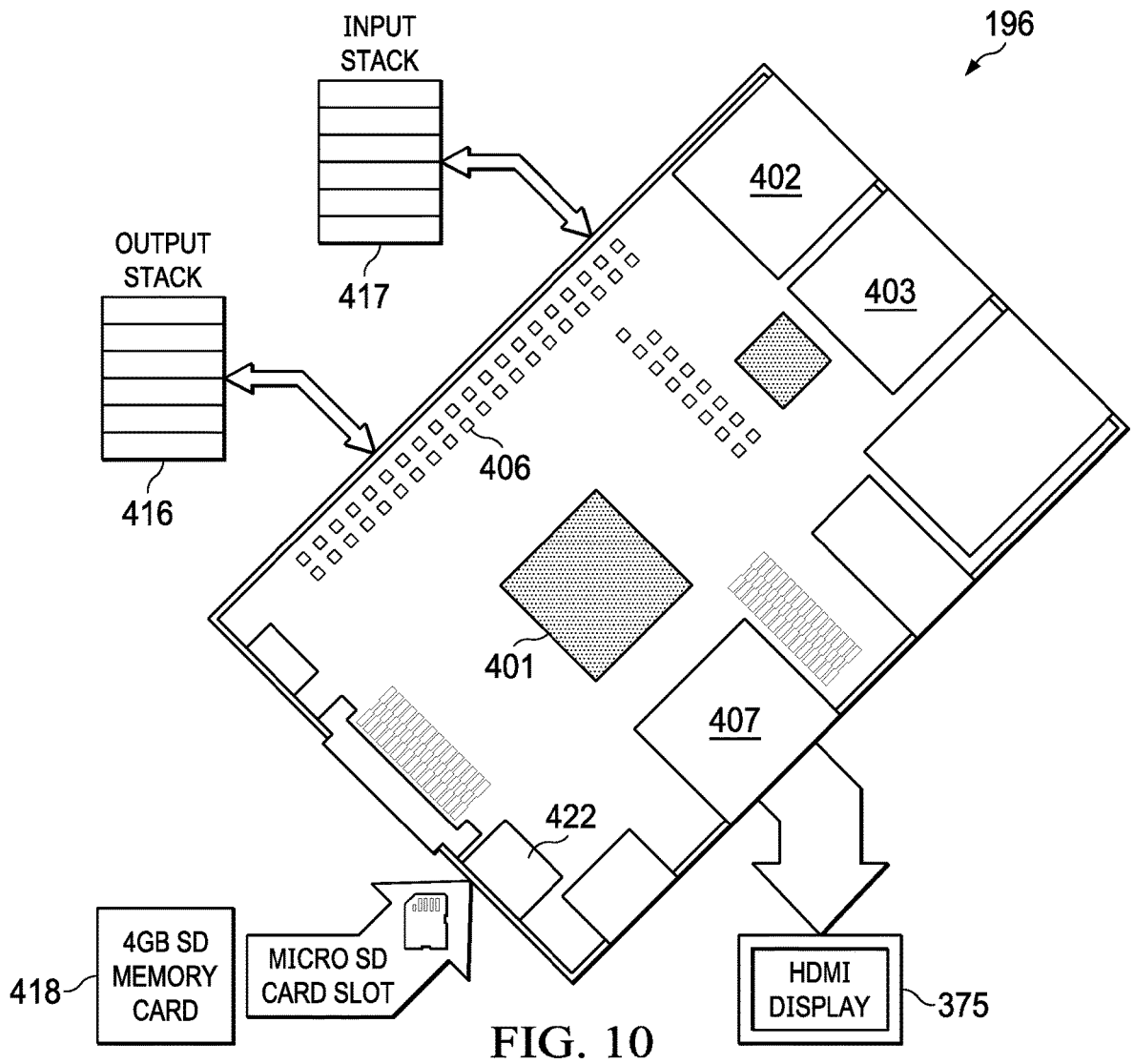
FIG. 10 is a schematic diagram of a controller of a preferred embodiment of the vehicle rollover simulator.

Referring to FIG. 10, a preferred embodiment of controller 196 is shown. In a preferred embodiment, the controller is a dedicated Razberi Pi 3 Model B available from digikey.com. The controller includes processor 401. In a preferred embodiment, processor 401 is a Broadcom BCM 2837 1.2 GHz Quad-Core processor. Controller 196 includes two USB 2.0 ports 402 and 403. The USB ports are useful for monitoring the processor during operation.

Controller 196 also includes a HDMI adapter 407 connected to HDMI display 375. Processor 401 is connected to memory card 418 via access slot 422. Code resident on the memory card is used to boot the processor and perform the operations of the controller, as will be further described.

Controller 196 includes GPIO connector 406. Input stack 417 and output stack 416 are connected to the processor through the GPIO connector. Input stack 417 includes optical encoder 508, start/stop switch 199 and override switch 197. Both the start/stop switch and the override switch are momentary SPST contact switches. Output stack 416 includes electric motor 602, brake 301 and brake 504. In a preferred embodiment, output stack 416 also includes green and red LED and an audible alarm.

Figure 11:
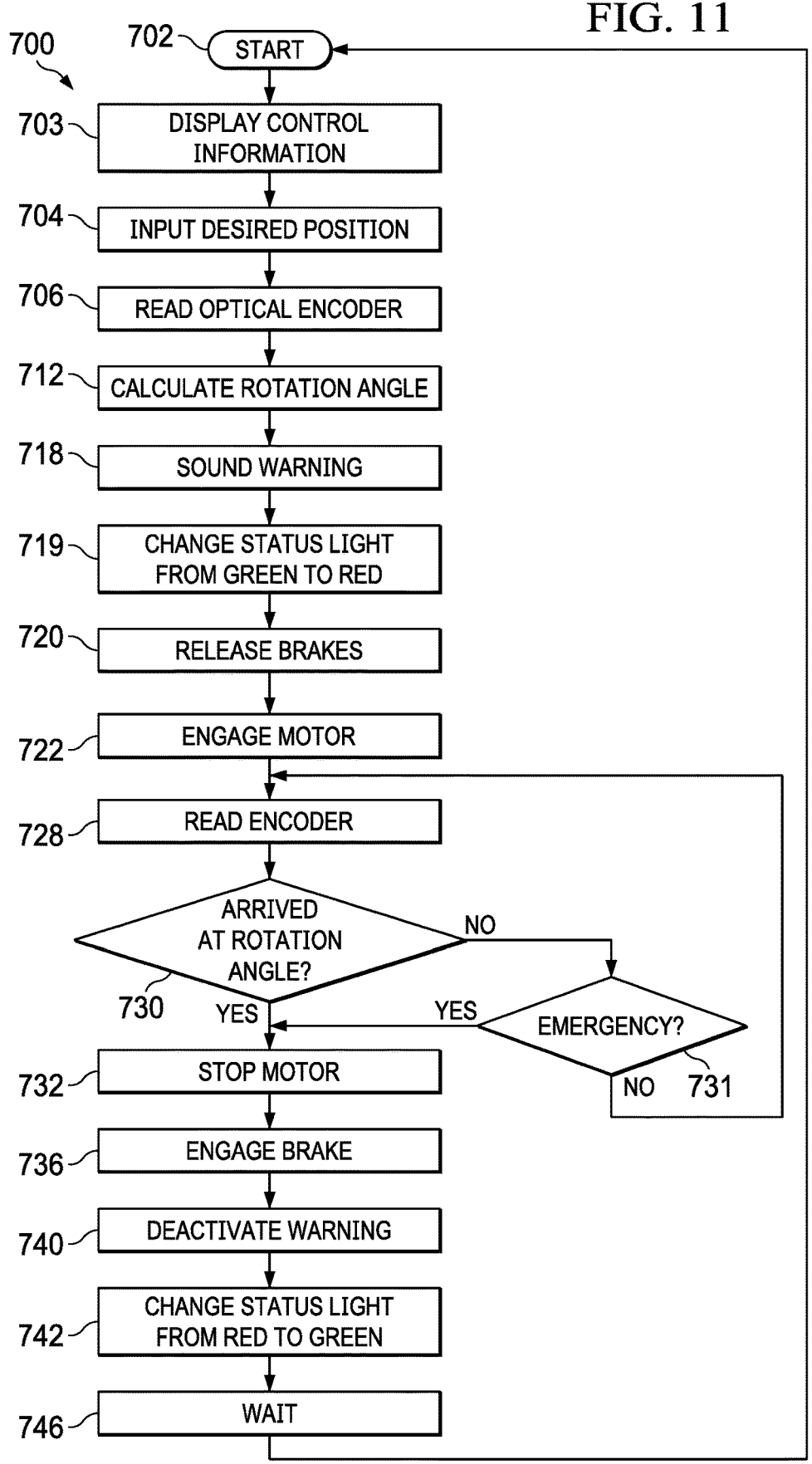
FIG. 11 is a flow diagram of a preferred embodiment of a vehicle rollover simulator process that can be implemented by a computer program.

Referring to FIG. 11, software flowchart 700 is depicted for control of rotation of cage assembly 110. The software represented by the flowchart is resident in the memory connected to the controller. In a preferred embodiment, the code is written in "C" but other programming languages are acceptable.

At step 702, the start/stop switch is polled by the processor which receives a start signal.

At step 703, control information is displayed by the controller on the display. For example, the desired angle of rotation may be represented by a number of drop-down menu items that are short-hand for a predetermined angular position. The menu items in one embodiment include 'upright', 'upright skew right', 'lateral right', 'inverted skew right', 'inverted', 'inverted skew left' 'lateral left', and 'upright skew left', corresponding to a final angular position 0°, 45°, 90°, 135°, 180°, 215°, 270°, and 315°, respectively. In other embodiments, the desired final rotation position may be input directly as digital numbers and can correspond to any angular position between 0° and 359°. In a preferred embodiment, the cage may rotate selectively in either a clockwise or a counter-clockwise direction. In an alternative embodiment, the cage is only allowed to rotate in a single direction.

At step 704, a desired rotary position alpha (α) is received by the controller from keypad 606.

At step 706, controller 196 reads optical encoder 508. The reading corresponds to the current angular position phi (Φ) of the cage assembly.

By convention, a current angular position phi (Φ) of the cage assembly, a desired angular position alpha (α) of the cage assembly and a required angular transition gamma (γ) are determined from the perspective of the output shaft of transmission motor assembly 240 shown in FIG. 2 as perspective "A". By convention, an angular position of 0° is defined as top dead center. Of course, the invention is not limited to these conventions.

At step 712, controller 196 calculates rotation angle gamma (γ) according to the algorithm:
If:
$$\alpha > \phi$$
Then:
$$\gamma = \alpha - \phi$$
If:
$$\alpha < \phi$$
Then:
$$\gamma = \phi - \alpha$$

At step 718, an indication is provided that the cage will begin rotation, or is entering a 'movement' mode. An audible warning alarm/alert is sounded through the horn. At step 719, the status light is changed from green to red.

At step 720 controller 196 releases brakes 301 and 504 simultaneously.

At step 722, controller 196 engages electric motor 602 and torque is transmitted through the transmission to rotate the cage assembly.

At step 728, controller 196 receives one or more readings from optical encoder 508 that represent the current angle of the cage.

At step 730, the controller determines whether or not the cage assembly has traveled the desired rotary angle gamma (γ). If so, then the process proceeds to step 732, where the motor is stopped.

If not, then the process moves to step 731. At step 731, the controller determines whether or not a signal is present from either override switch 197 or stop/start switch 199. If so then, the process moves to step 732, where the motor is stopped. If not, then then the process returns to step 728.

At step 736, the controller activates brakes 301 and 504.

At step 740, the controller deactivates the horn.

At step 742, the red LED is deactivated and the green LED is activated, indicating a 'stable' mode or condition.

At step 746, controller 196 enters a wait state in which it continuously polls the start/stop switch.

Figure 12:
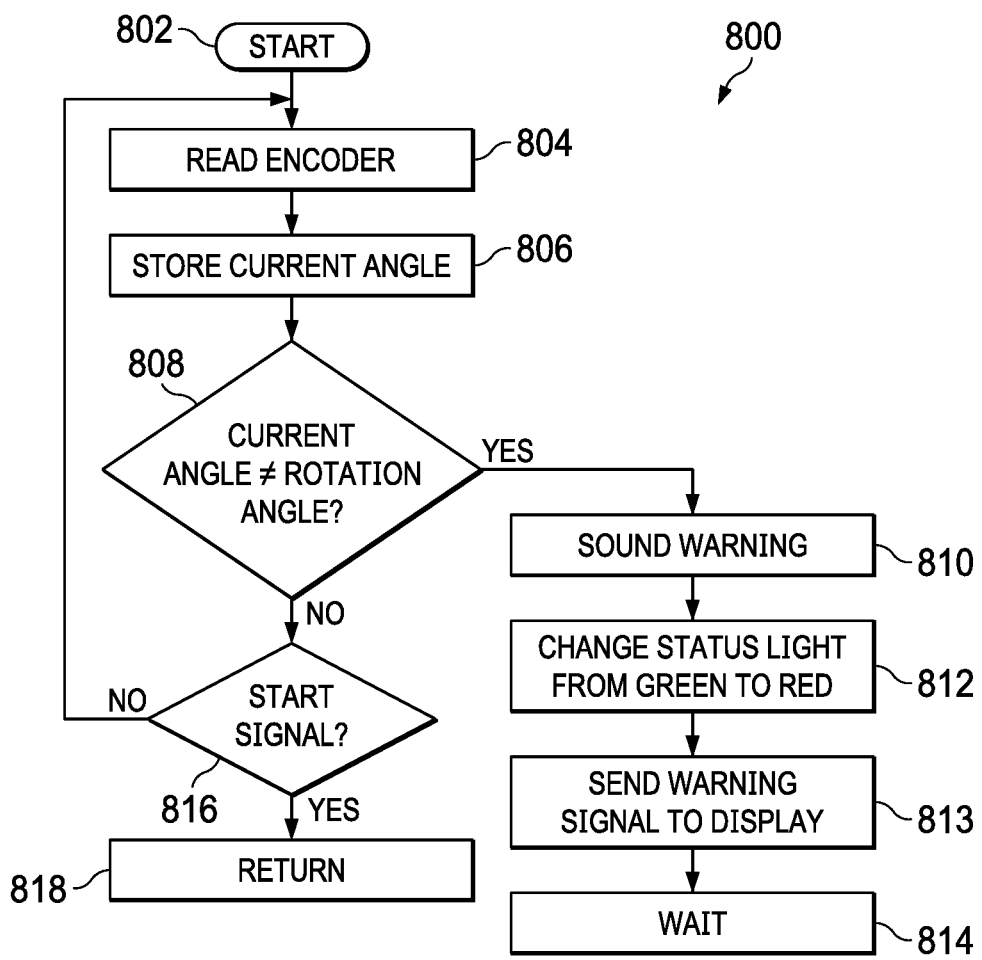
FIG. 12 is a flow diagram of a preferred embodiment of a vehicle rollover failsafe process that can be implemented by a computer program.

Referring to FIG. 12, software flow chart 800 is depicted for a failsafe process which may be enabled during wait state 746.

At step 802, the process begins. At step 804, the processor reads the encoder. At step 806, the current angle from the encoder is stored in memory.

At step 808, the current angle is compared to the rotation angle. If the current angle is not equal to the rotation angle, then the process moves to step 810. If the current angle is equal to the rotation angle, then the process moves to step 816.

At step 810, an audible warning alarm/alert is sounded through the horn. At step 812, the status light is changed from green to red.

At step 813, the controller sends a warning message to the display. At step 814, controller 196 enters a wait state in which case it continually polls the start/stop switch for a reset signal.

At step 816, controller checks for a start signal from the start/stop switch. If no start/stop signal is received, then the process returns to step 804. If a start/stop signal is received, then the processor moves to step 818. At step 818, the failsafe process concludes and control is returned to the main loop.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A vehicle rollover simulator apparatus comprising:
   a base frame;
   a front stanchion, having a first bearing block, removably attached to the base frame;
   a rear stanchion, having a second bearing block, removably attached to the base frame;
   a dual beam v-type motor support, removably attached to the rear stanchion, adjacent the second bearing block;
   a floor panel subassembly, detachably connected to a front panel subassembly and a rear panel subassembly;
   a roof panel subassembly, detachably connected to the front panel subassembly and the rear panel subassembly;
   a first side brace, detachably connected to the roof panel subassembly and the floor panel subassembly;
   a second side brace, detachably connected to the roof panel subassembly and the floor panel subassembly;
   a plurality of passenger seats, detachably connected to the floor panel subassembly, adjacent the first side brace and the second side brace;
   a front support shaft, rigidly attached to the front panel subassembly, rotatably positioned in the first bearing block;
   a rear support shaft, rigidly attached to the rear panel subassembly, rotatably positioned in the second bearing block;
   a motor assembly, detachably connected to the dual beam v-type motor support, and operatively connected to the rear support shaft; and,
   whereby activation of the motor assembly simulates a vehicle rollover.

2. The vehicle rollover simulator apparatus of claim 1 wherein the floor panel subassembly further comprises a plurality of longitudinal support tracks adapted to adjustably support the plurality of passenger seats in a linear pattern.

3. The vehicle rollover simulator apparatus of claim 1 wherein the roof panel subassembly further comprises a perimeter frame rigidly connected to a pair of latitudinal cross braces and a longitudinal brace.

4. The vehicle rollover simulator apparatus of claim 3 wherein the roof panel subassembly further comprises a hinged subpanel section connected to the longitudinal brace and movable between an open position and a closed position.

5. The vehicle rollover simulator apparatus of claim 1 wherein the rear panel subassembly further comprises:
   a perimeter frame;
   a lateral brace connected to the perimeter frame;
   a vertical brace connected to the perimeter frame; and,
   a reinforcement plate, removably attached to the lateral brace and the vertical brace, supporting the rear support shaft.

6. The vehicle rollover simulator apparatus of claim 1 wherein the front panel subassembly further comprises:
   an angled perimeter frame;
   an angled vertical brace, connected to the angled perimeter frame;
   a lateral brace, connected to the angled perimeter frame; and, a midpoint connector, removably attached to the angled vertical brace and the lateral brace, supporting the front support shaft.

7. The vehicle rollover simulator apparatus of claim 1 wherein the base frame further comprises:
a first longitudinal fork lift channel, adjacent the dual beam v-type motor support;
a second longitudinal fork lift channel, adjacent the dual beam v-type motor support; and,
whereby the vehicle rollover simulator may be lifted without causing rotation of the front panel subassembly and the rear panel subassembly.

8. The vehicle rollover simulator apparatus of claim 1 wherein the dual beam v-type motor support further comprises:
a base plate;
a vertical t-beam, adjacent the rear stanchion, rigidly fixed to the base plate;
a diagonal t-beam, forming an acute angle with the vertical t-beam, rigidly fixed to the base plate;
a mounting plate rigidly affixed to the vertical t-beam and the diagonal t-beam; and,
an angle brace, rigidly affixed to the mounting plate and to the rear stanchion.

9. The vehicle rollover simulator apparatus of claim 1 wherein the motor assembly further comprises:
an electric motor, operatively connected to a motor control system; and,
a step down transmission, supported by a mounting plate, operatively connected to the electric motor and the rear support shaft.

10. The vehicle rollover simulator apparatus of claim 9 wherein the motor control system further comprises:
a processor, having a memory;
a keypad, operatively connected to the processor;
a display, operatively connected to the processor;
a position encoder operatively connected to the processor and one of a group of the front support shaft and the rear support shaft; and,
a set of program instructions, resident in the memory, that when executed by the processor cause the motor control system to:
receive a desired position from the keypad;
calculate a rotation angle;
engage the electric motor;
read the position encoder for a first current angle;
compare the desired position with a first current angle; and,
if the first current angle is equal to the desired position, then disengaging the electric motor.

11. The vehicle rollover simulator apparatus of claim 10 further comprises:
an electric brake operatively connected to the processor and mounted between one of a group of:
the front support shaft and the front stanchion; and,
the rear support shaft and the rear stanchion; and wherein,
the set of program instructions further comprise:
releasing the electric brake before engaging the electric motor; and,
engaging the electric brake after disengaging the electric motor.

12. The vehicle rollover simulator apparatus of claim 10 further comprising:
an alarm operatively connected to the processor; and,
the set of program instructions further comprise:

engaging the alarm before engaging the electric motor; and,
disengaging the alarm after disengaging the electric motor.

13. The vehicle rollover simulator apparatus of claim 10 further comprising:
a switch, positioned on one of a group of front panel subassembly, the rear panel subassembly, the roof panel subassembly and the floor panel subassembly, and operatively connected to the processor; and wherein,
the set of program instructions further comprise:
checking the switch for an emergency signal after engaging the electric motor; and,
disengaging the electric motor if the emergency signal is received.

14. The vehicle rollover simulator apparatus of claim 10 wherein the set of program instructions further comprise:
reading the position encoder for a second current angle;
comparing the desired position with the second current angle; and,
if the second current angle is not equal to the desired position, then sending a warning signal to the display.

15. A method of simulating a vehicle rollover comprising:
providing a base frame;
providing a front stanchion, having a first bearing block removably attached to the base frame;
providing a rear stanchion, having a second bearing block removably attached to the base frame;
providing a dual beam v-type motor support removably attached to the rear stanchion adjacent the second bearing block;
providing a floor panel subassembly detachably connected to a front panel subassembly and a rear panel subassembly;
providing a roof panel subassembly detachably connected to the front panel subassembly and the rear panel subassembly;
providing a first side brace, detachably connected to the roof panel subassembly and the floor panel subassembly;
providing a second side brace, detachably connected to the roof panel subassembly and the floor panel subassembly;
providing a plurality of passenger seats detachably connected to the floor panel subassembly, adjacent the first side brace and the second side brace;
providing a front support shaft, rigidly attached to the front panel subassembly, positioned in the first bearing block;
providing a rear support shaft, rigidly attached to the rear panel subassembly, positioned in the second bearing block;
providing a motor assembly, detachably connected to the dual beam v-type motor support, and operatively connected to the rear support shaft; and,
activating the motor assembly to simulate a vehicle rollover.

16. The method of claim 15 further comprising:
providing the floor panel subassembly with a plurality of longitudinal support tracks; and,
adjusting the plurality of passenger seats in a linear pattern.

17. The method of claim 15 further comprising:
providing the roof panel subassembly with a hinged subpanel section connected to a longitudinal brace; and, moving the hinged subpanel section between an open position and a closed position.

18. The method of claim 15 further comprising:
providing the rear panel subassembly with:
- a perimeter frame;
- a lateral brace connected to the perimeter frame;
- a vertical brace connected to the perimeter frame; and,
- a reinforcement plate, removably attached to the lateral brace and the vertical brace, supporting the rear support shaft.

19. The method of claim 15 further comprising:
providing the front panel subassembly further with:
- an angled perimeter frame;
- an angled vertical brace, connected to the angled perimeter frame;
- a lateral brace, connected to the angled perimeter frame; and,
- a midpoint connector, removable attached to the angled vertical brace and the lateral brace, supporting the front support shaft.

20. The method of claim 15 wherein the step of providing the dual beam v-type motor support further comprises:
providing a base plate;
providing a vertical t-beam, adjacent the rear stanchion, rigidly fixed to the base plate;
providing a diagonal t-beam, forming an acute angle with the vertical t-beam, rigidly fixed to the base plate;
providing a mounting plate rigidly affixed to the vertical t-beam and the diagonal t-beam; and,
providing an angle brace, rigidly affixed to the mounting plate and to the rear stanchion.

* * * * *